US009263860B2

(12) United States Patent
Crooks et al.

(10) Patent No.: US 9,263,860 B2
(45) Date of Patent: Feb. 16, 2016

(54) POWER DISTRIBUTION SYSTEM, AND SWITCHGEAR ASSEMBLY, AND MOUNTING MEMBER THEREFOR

(71) Applicant: EATON CORPORATION, Cleveland, OH (US)

(72) Inventors: William Michael Crooks, Sumter, SC (US); Dawn S. Florence, Sumter, SC (US)

(73) Assignee: EATON CORPORATION, Cleveland, OH (US)

( * ) Notice: Subject to any disclaimer, the term of this patent is extended or adjusted under 35 U.S.C. 154(b) by 207 days.

(21) Appl. No.: 14/155,637

(22) Filed: Jan. 15, 2014

(65) Prior Publication Data

US 2015/0200525 A1   Jul. 16, 2015

(51) Int. Cl.
*H02B 1/04* (2006.01)
*H02B 1/03* (2006.01)

(52) U.S. Cl.
CPC .. *H02B 1/04* (2013.01); *H02B 1/03* (2013.01); *H02B 1/042* (2013.01)

(58) Field of Classification Search
CPC ................................. H02B 1/03; H02B 1/04
See application file for complete search history.

(56) References Cited

U.S. PATENT DOCUMENTS

| 6,614,219 | B2* | 9/2003 | Dadian | G01R 22/065 |
| | | | | 324/142 |
| 6,865,073 | B2* | 3/2005 | Werner | H02B 1/21 |
| | | | | 324/126 |
| 7,578,711 | B2* | 8/2009 | Robinson | H01H 71/08 |
| | | | | 335/202 |
| 9,042,084 | B2* | 5/2015 | Pever | H01H 71/08 |
| | | | | 361/652 |

* cited by examiner

*Primary Examiner* — Robert J Hoffberg
(74) *Attorney, Agent, or Firm* — Eckert Seamans Cherin & Mellott, LLC; John P. Powers; Philip E. Levy

(57) ABSTRACT

A mounting member for a switchgear assembly is provided. The switchgear assembly includes a mounting element, an electrical switching apparatus having a number of terminals and being coupled to the mounting element, a metering module having a number of terminals and being spaced from the electrical switching apparatus, a number of electrical conductors electrically connecting the terminals of the metering module to the terminals of the electrical switching apparatus, and a support member adjacent the electrical switching apparatus. The mounting member includes a base portion structured to retain the metering module; a number of coupling portions structured to couple the mounting member to the support member; and a number of directing portions, each directing portion being structured to receive a corresponding one of the electrical conductors.

20 Claims, 5 Drawing Sheets

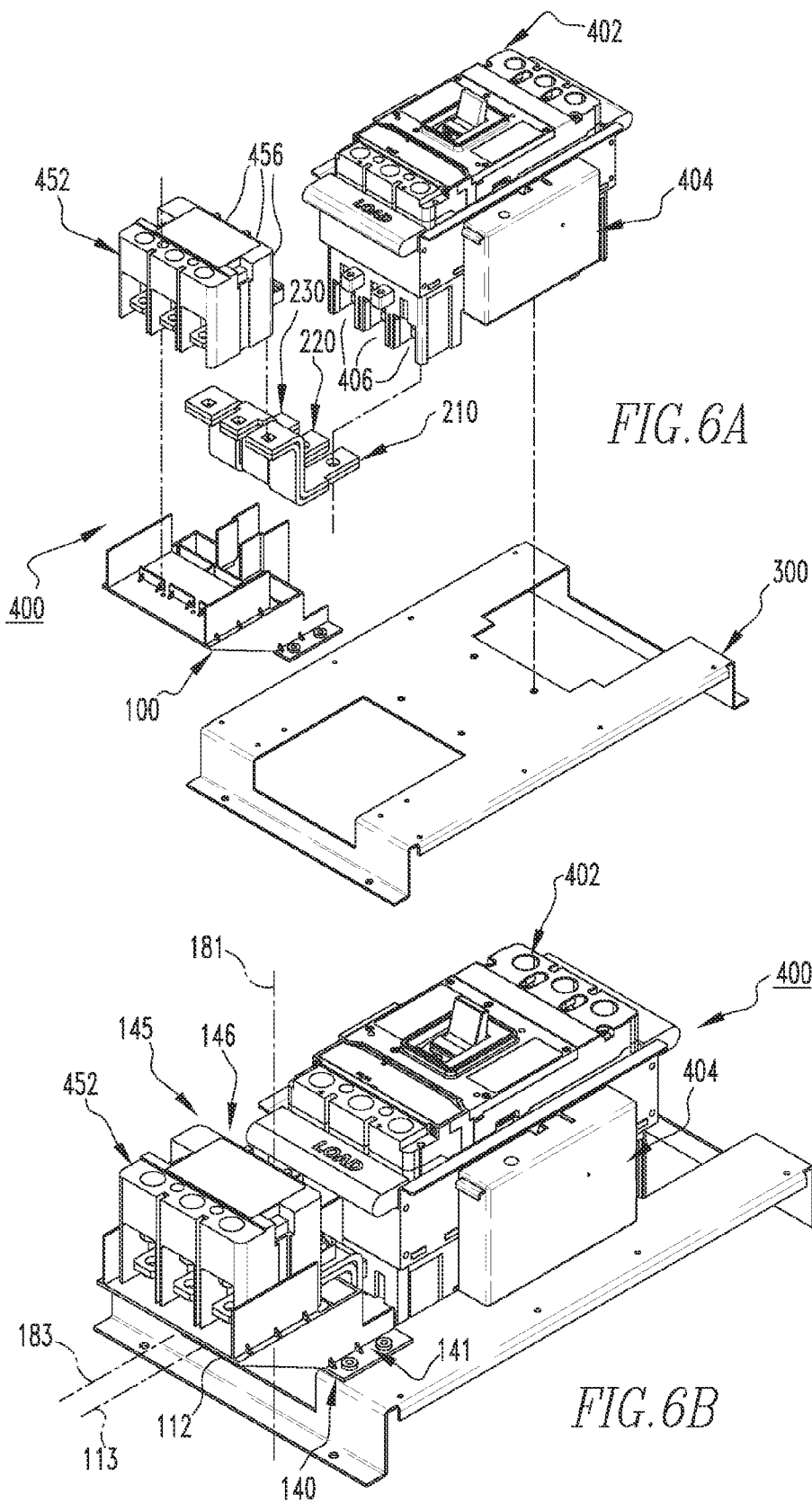

POWER DISTRIBUTION SYSTEM, AND SWITCHGEAR ASSEMBLY, AND MOUNTING MEMBER THEREFOR

BACKGROUND

1. Field

The disclosed concept pertains generally to power distribution systems and, more particularly to power distribution systems including electrical enclosures such as for example, panelboards and switchboards. The disclosed concept also pertains to switchgear assemblies for power distribution systems, such as for example, electrical switching apparatus including a metering module. The disclosed concept further relates to mounting members for switchgear assemblies.

2. Background Information

Electrical switching apparatus used in power distribution systems are often mounted within a switchgear enclosure either individually or in combination with other switchgear (e.g., without limitation, circuit switching devices and circuit interrupters such as circuit breakers, contactors, motor starters, motor controllers and other load controllers). Molded case circuit breakers, for example, include at least one pair of separable contacts which are operated either manually by way of a handle located on the outside of a case, or automatically by way of a trip unit, in response to a trip condition.

In known power distribution systems, metering modules (e.g., without limitation, power monitoring metering modules) are often coupled to electrical switching apparatus to monitor current and voltage. Additionally, some electrical switching apparatus such as, for example, some medium-voltage and low-voltage circuit breakers, can be relatively large. In order to facilitate movement (e.g., installation; removal; maintenance), such circuit breakers are commonly coupled to draw-out mechanisms which permit the circuit breakers to be relatively easily moved into and out of the switchgear enclosure.

Referring to FIG. 1A, a three phase molded case circuit breaker 2 includes a housing 4 and a molded case 6 on the outside of the housing 4. The housing 4 includes a cover 8 and an opening 10 through which an operating handle 12 extends. The circuit breaker 2 includes a load side 14 having a number of load conductor receptacles 16. A number of load terminals 18 are located within the load conductor receptacles 16. A metering module 52 is structured to be coupled to the circuit breaker 2, as shown in FIG. 1B, and includes an attachment portion 54 structured to be attached to a corresponding portion 20 of the circuit breaker 2. In the attached position of FIG. 1B, the attachment portion 54 of the metering module 52 abuts the portion 20 of the circuit breaker 2.

Referring to FIG. 2, the circuit breaker 2 is shown installed inside a draw-out element 32 (partially shown). As seen, the draw-out element 32 includes a projection 34 that extends from the load side 14 of the circuit breaker 2 a distance 36. Accordingly, the metering module 52 (FIGS. 1A and 1B) cannot be attached to the circuit breaker 2. In other words, the metering module 52 cannot be physically accommodated by the circuit breaker 2 when it is installed inside of the draw-out element 32.

There is thus room for improvement in power distribution systems, and in switchgear assemblies and mounting members therefor.

SUMMARY

These needs and others are met by embodiments of the disclosed concept wherein a mounting member is provided which among other benefits, allows a metering module to be accommodated by an electrical switching apparatus when the electrical switching apparatus is installed inside of a mounting element.

In accordance with one aspect of the disclosed concept, a mounting member for a switchgear assembly is provided. The switchgear assembly includes a mounting element, an electrical switching apparatus having a number of terminals and being coupled to the mounting element, a metering module having a number of terminals and being spaced from the electrical switching apparatus, a number of electrical conductors electrically connecting the terminals of the metering module to the terminals of the electrical switching apparatus, and a support member adjacent the electrical switching apparatus. The mounting member includes a base portion structured to retain the metering module; a number of coupling portions structured to couple the mounting member to the support member; and a number of directing portions, each directing portion being structured to receive a corresponding one of the electrical conductors.

As another aspect of the disclosed concept, a switchgear assembly includes a mounting element; an electrical switching apparatus having a number of terminals and being coupled to the mounting element; a metering module having a number of terminals and being spaced from the electrical switching apparatus; a number of electrical conductors electrically connecting the terminals of the metering module to the terminals of the electrical switching apparatus; a support member adjacent the electrical switching apparatus; and a mounting member. The mounting member includes: a base portion, the metering module being retained in the base portion; a number of coupling portions coupling the mounting member to the support member; and a number of directing portions, each directing portion receiving a corresponding one of the electrical conductors.

As another aspect of the disclosed concept, a power distribution system is provided. The power distribution system includes an electrical enclosure and a switchgear assembly located on the electrical enclosure. The switchgear assembly includes a mounting element; an electrical switching apparatus having a number of terminals and being coupled to the mounting element; a metering module having a number of terminals and being spaced from the electrical switching apparatus; a number of electrical conductors electrically connecting the terminals of the metering module to the terminals of the electrical switching apparatus; a support member adjacent the electrical switching apparatus; and a mounting member. The mounting member includes: a base portion, the metering module being retained in the base portion; a number of coupling portions coupling the mounting member to the support member; and a number of directing portions, each directing portion receiving a corresponding one of the electrical conductors.

BRIEF DESCRIPTION OF THE DRAWINGS

A full understanding of the disclosed concept can be gained from the following description of the preferred embodiments when read in conjunction with the accompanying drawings in which:

FIG. 6A is an exploded isometric view of a switchgear assembly in accordance with an aspect of the disclosed concept;

FIG. 6B is an assembled isometric view of the switchgear assembly of FIG. 6A;

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

Figure 7A:
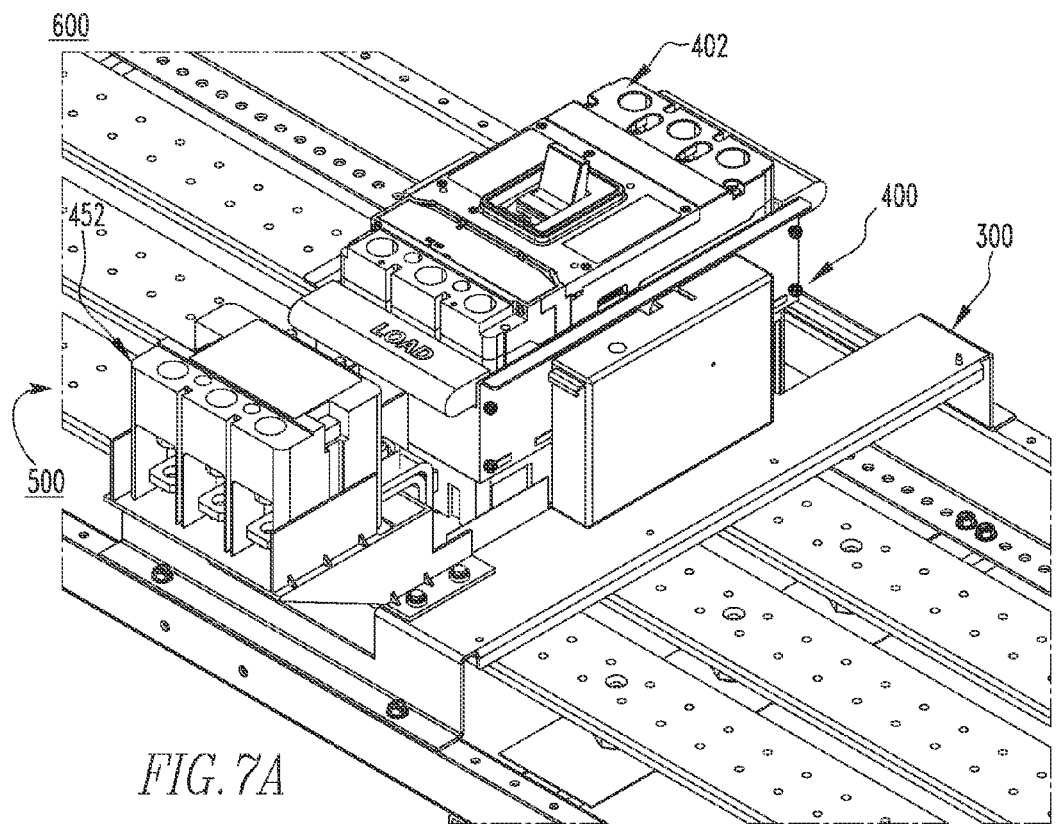
FIG. 7A is an isometric view of the switchgear assembly of FIG. 6A, shown installed in an electrical enclosure of a power distribution system, in accordance with an aspect of the disclosed concept.
Figure 7B:
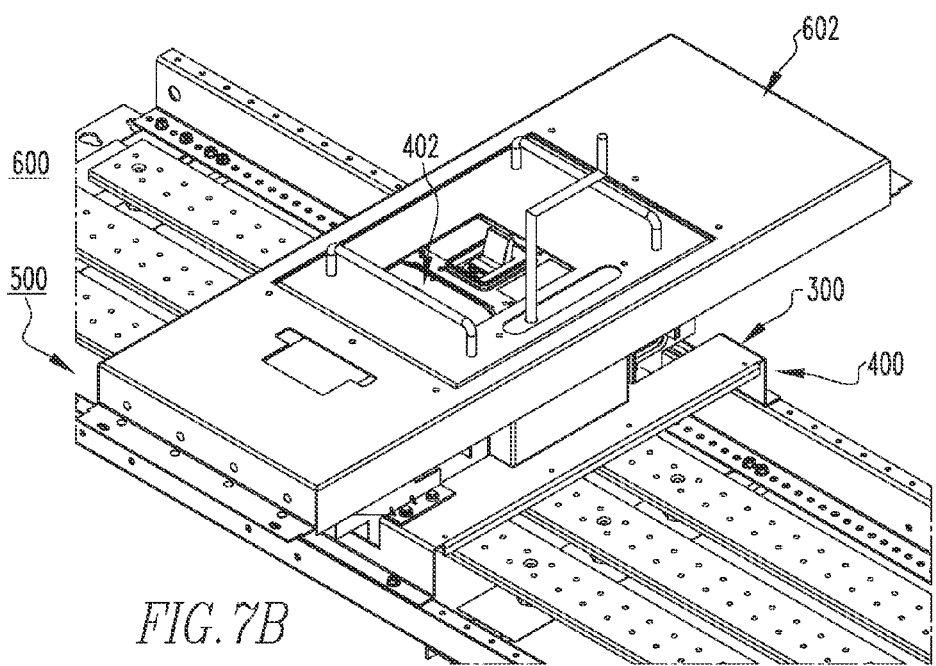
FIG. 7B is an isometric view of the portion of the power distribution system, and switchgear assembly and mounting member therefor of FIG. 7A, modified to show the assembly installed with a cover.

FIGS. 3A, 3B, 3C and 3D show a mounting member 100 that may be used in a switchgear assembly (e.g., without limitation, switchgear assembly 400 shown in FIGS. 6A, 6B, 7A and 7B). As seen, the mounting member 100 includes a base portion 110 structured to retain a metering module (e.g., without limitation, power monitoring metering module 452 shown in FIGS. 6A, 6B and 7A). Continuing to refer to FIGS. 3A, 3B, 3C and 3D, the base portion 110 of the mounting member 100 includes a mounting surface 112 structured to engage the metering module 452 (FIGS. 6A, 6B and 7A).

Figure 1A:
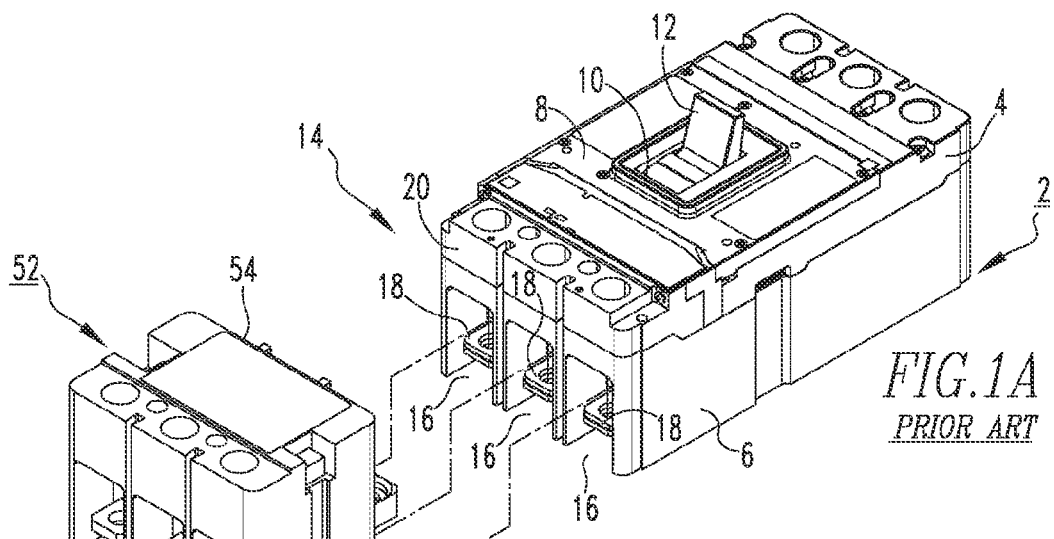
FIG. 1A is an exploded isometric view of a prior art molded case circuit breaker and metering module.
Figure 1B:
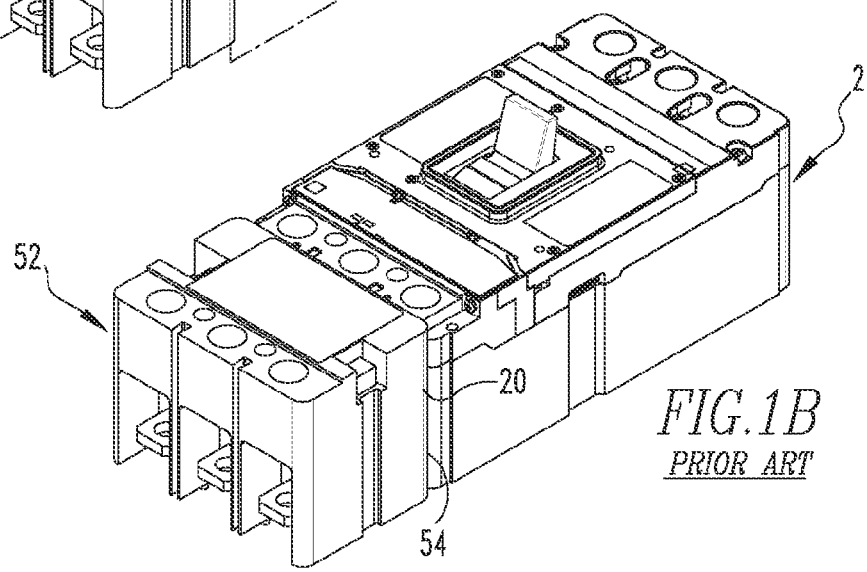
FIG. 1B is an isometric view of the molded case circuit breaker and metering module of FIG. 1A coupled to each other.
Figure 2:
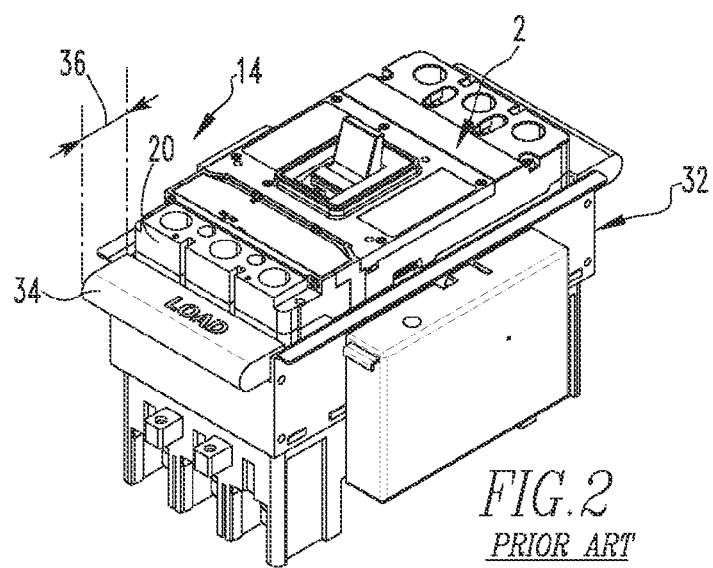
FIG. 2 is an isometric view of a prior art molded case circuit breaker installed inside of a draw-out element.
Figure 3:
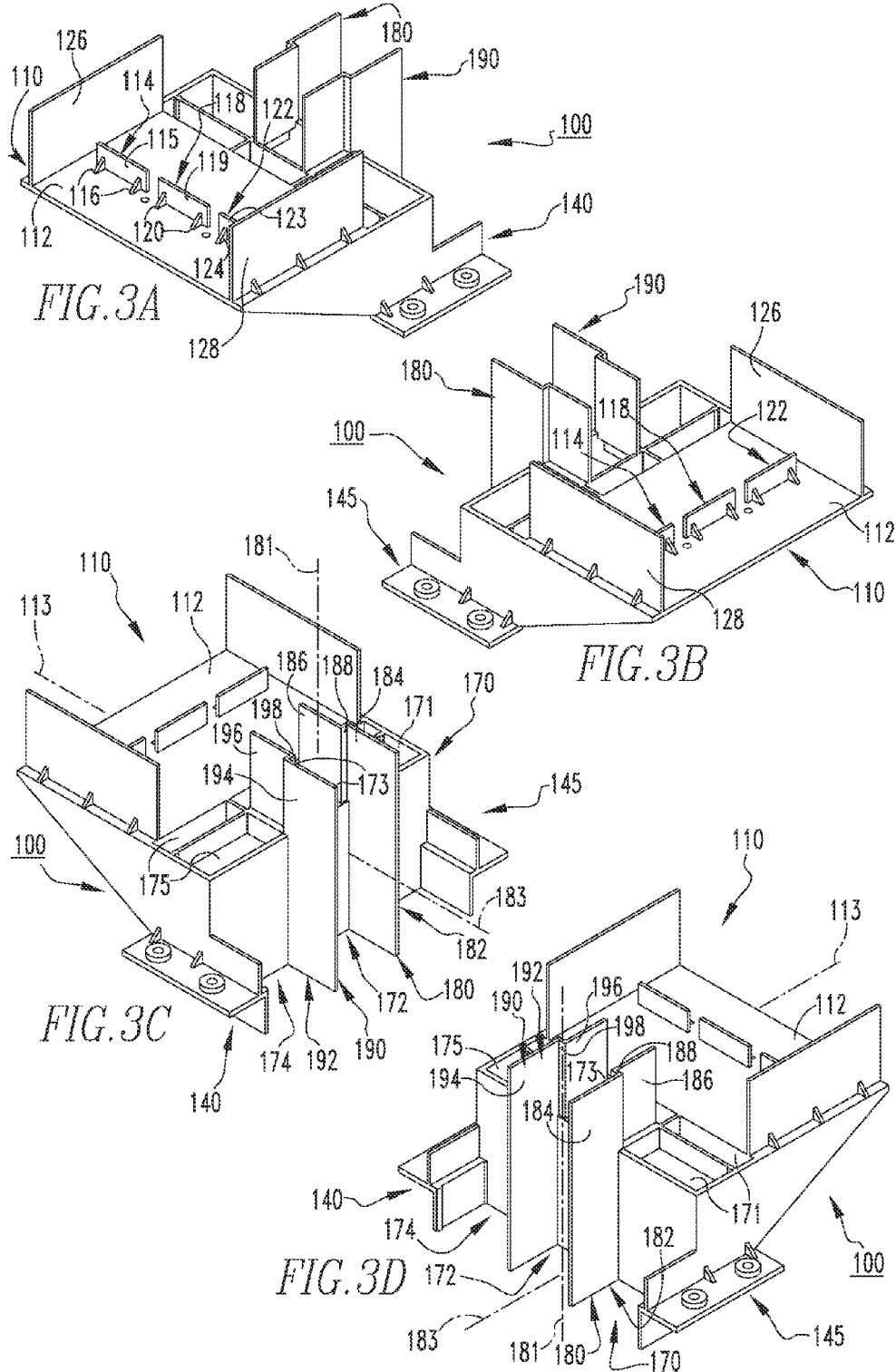
FIG. 3A is a front left isometric view of a mounting member for a switchgear assembly, in accordance with an aspect of the disclosed concept.
FIG. 3B is a front right isometric view of the mounting member of FIG. 3A.
FIG. 3C is a back right isometric view of the mounting member of FIG. 3B.
FIG. 3D is a back left isometric view of the mounting member of FIG. 3C.

Additionally, the base portion 110 includes a number of protrusions 114,118,122 structured to extend into and engage the metering module 452 (FIGS. 6A, 6B and 7A). In this manner, the protrusions 114,118,122 advantageously hold the metering module 452 in the desired, predetermined position and prevent it from moving side-to-side while being retained in the base portion 110 of the mounting member 100. As seen in FIG. 3A, each of the protrusions 114,118,122 includes a corresponding planar portion 115,119,123. The planar portions 115,119,123 are coplanar with each other and each of the protrusions 114,118,122 includes a corresponding number of brace members 116,120,124 structured to support the planar portions 115,119,123. Although each protrusion 114,118,122 includes two brace members 116,120,124, it is within the scope of the disclosed concept for each protrusion 114,118,122 to include more than two or less than two brace members (not shown).

The base portion 110 further includes a number of retaining walls 126,128 that are structured to retain the metering module 452. The retaining walls 126,128, like the protrusions 114,118,122, advantageously prevent the metering module from moving side-to-side while being retained in the mounting member 100. As seen, the retaining walls 126,128 are parallel to each other. In this manner, the metering module 452 is structured to be located between the retaining walls 126,128. Furthermore, the planar portions 115,119,123 of the aforementioned protrusions 114,118,122 are normal to the retaining walls 126,128.

Continuing to refer to FIGS. 3A, 3B, 3C and 3D, the mounting member 100 also includes a number of coupling portions 140,145 (two are shown) structured to couple the mounting member 100 to a support member (e.g., without limitation, support member 300 shown in FIGS. 5, 6A, 6B, 7A and 7B). The mounting member 100 also includes a number of dividing walls 180,190 and a number of directing portions 170,172,174, each of the dividing walls 180,190 being located between a corresponding pair of the directing portions 170,172,174. The directing portions 170,172,174 each include a number of corresponding recesses 171,173, 175 located adjacent the mounting surface 112. The recesses 171,173,175 advantageously allow for more cost efficient fabrication as well as allow an individual to more easily grasp the mounting member 100. Additionally, although each directing portion 170,172,174 includes two corresponding recesses 171,173,175, it is within the scope of the disclosed concept to include any number of recesses.

Additionally, the mounting surface 112 of the base portion 110 is located in a plane 113 and each of the dividing walls 180,190 is an elongated member 182,192 extending in a first direction 181 normal to the plane 113. Referring to FIGS. 3C and 3D, each of the dividing walls 180,190 includes a corresponding first planar member 184,194 and a corresponding second planar member 186,196. The first planar members 184,194 are parallel to the second planar members 186,196.

Additionally, each of the dividing walls 180,190 includes a corresponding third planar member 188,198 located between and being normal to the first planar members 184,194 and the second planar members 186,196. Although the first planar members 184,194 are parallel to and spaced from the second planar members 186,196 (i.e., offset with respect to), it is within the scope of the disclosed concept for the first planar members 184,194 to be coplanar with the second planar members 186,196, such that there are no third planar members 188,198.

Figure 4:
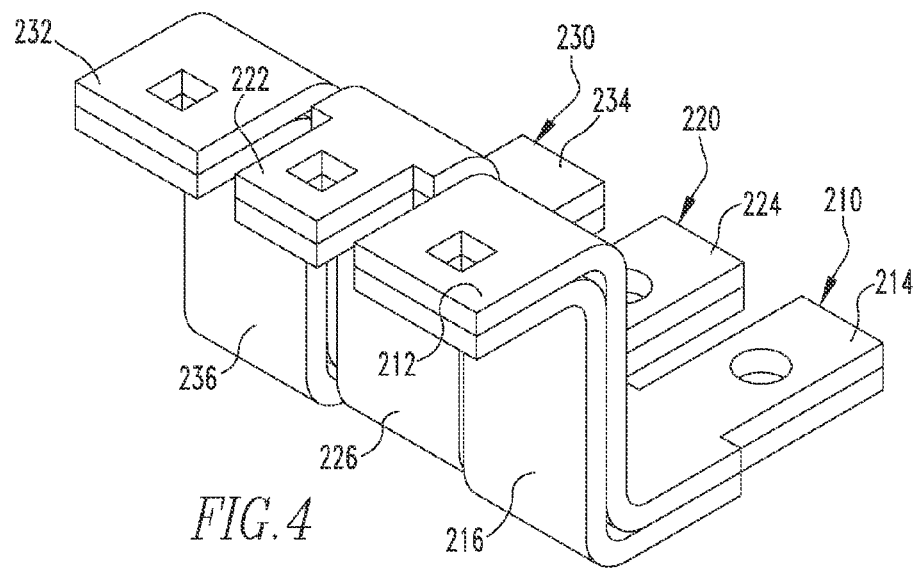
FIG. 4 is an isometric view of a number of electrical conductors for a switchgear assembly in accordance with another aspect of the disclosed concept.

FIG. 4 shows a number of electrical conductors 210,220, 230 structured to electrically connect the metering module 452 (FIGS. 6A, 6B and 7A) to an electrical switching apparatus (e.g., without limitation, three phase molded case circuit breaker 402 shown in FIGS. 6A, 6B, 7A, and 7B). As seen in FIG. 4, each of the electrical conductors 210,220,230 includes a corresponding first portion 212,222,232 structured to be electrically connected to a corresponding terminal (e.g., without limitation, terminals 456, partially shown in FIG. 6A) of the metering module 452.

Each of the electrical conductors 210,220,230 further includes a corresponding second portion 214,224,234 structured to be electrically connected to a corresponding terminal (e.g., without limitation, terminals 406, partially shown in FIG. 6A) of the circuit breaker 402. In this manner, and as will be discussed hereinbelow, the metering module 452 is structured to be spaced from and be electrically connected to the circuit breaker 402. Continuing to refer to FIG. 4, each of the electrical conductors 210,220,230 includes a corresponding third portion 216,226,236 located between the first portions 212,222,232 and the second portions 214,224,234. As seen, the first portions 212,222,232 of the electrical conductors 210,220,230 are parallel to the second portions 214,224,234 and normal to the third portions 216,226,236. In other words, in the example shown, each of the electrical conductors 210, 220,230 has two bends, although it will be appreciated that any known or suitable alternative number of bends (not shown) or other configurations could be employed to make the desirable electrical connections.

Referring to FIGS. 3A, 3B, 3C, 3D and 4, each of the directing portions 170,172,174 of the mounting member 100 is structured to receive a corresponding one of the electrical conductors 210,220,230. Together, the directing portions 170,172,174 and the dividing walls 180,190 advantageously separate and thereby electrically insulate the electrical conductors 210,220,230. Furthermore, and with reference to FIG. 6B, each of the coupling portions 140,145 is coupled to the support member 300 at a corresponding junction 141,146. As seen, the junctions 141,146 are structured to be spaced from the plane 113 of the mounting surface 112 in the first direction 181 and spaced from the mounting surface 112 in a second direction 183 normal to the first direction 181.

Figure 5:
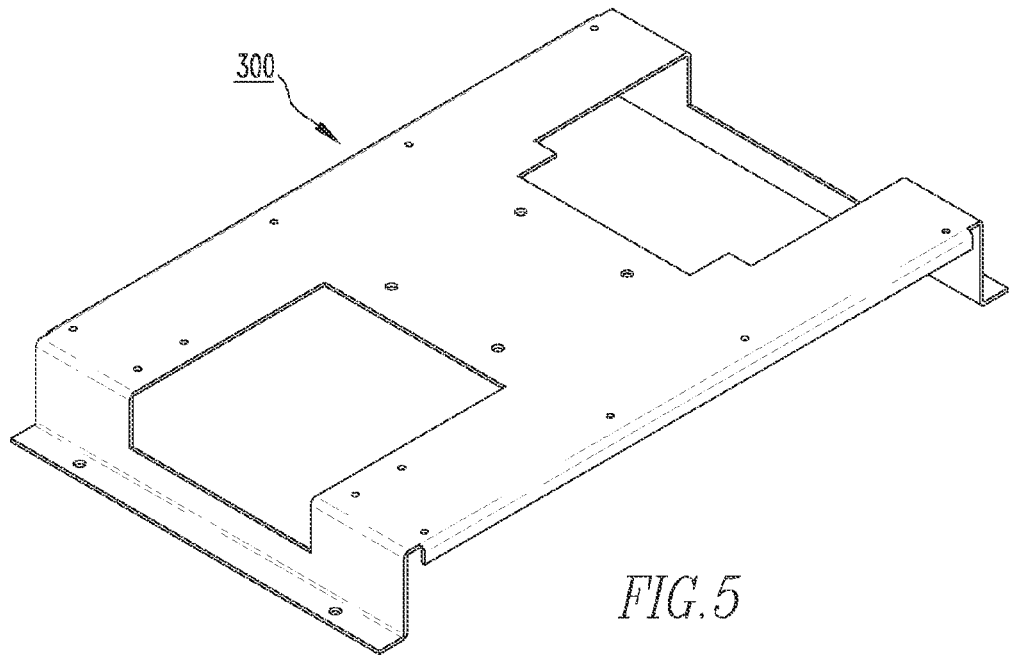
FIG. 5 is an isometric view of a support member for a switchgear assembly in accordance with another aspect of the disclosed concept.

FIG. 5 shows the support member 300 of the switchgear assembly 400 (FIGS. 6A, 6B, 7A and 7B). FIG. 6A shows an exploded isometric view of the switchgear assembly 400. As seen, the circuit breaker 402 is installed inside of a mounting element (e.g., without limitation, draw-out element 404). Furthermore, the electrical conductors 210,220,230 are structured to electrically connect the terminals 456 of the metering module 452 to the terminals 406 of the circuit breaker 402. In this manner, the metering module 452 is advantageously able to be employed with the circuit breaker 402 when the circuit breaker 402 is installed inside of (or otherwise coupled to) the draw-out element 404. Additionally, the disclosed concept is not limited to the three-phase molded case circuit breaker 402 and the metering module 452. For example and without limitation, it is within the scope of the disclosed concept for a switchgear assembly (not shown) to employ a two-phase molded case circuit breaker and corresponding metering module, using a mounting member (not shown) that includes two directing portions and employing two electrical conductors to couple the metering module to the circuit breaker.

Referring to FIG. 7A, the switchgear assembly 400 is installed in an electrical enclosure (e.g., without limitation, panelboard or switchboard 500) of a power distribution system 600 (partially shown). In addition to the electrical enclosure 500, the power distribution system 600 includes a cover 602, shown in FIG. 7B, such that the circuit breaker 402 and the metering module 452 are located between the cover 602 and the support member 300.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A mounting member for a switchgear assembly, the switchgear assembly comprising a mounting element, an electrical switching apparatus having a number of terminals and being coupled to the mounting element, a metering module having a number of terminals and being spaced from the electrical switching apparatus, a number of electrical conductors electrically connecting the terminals of the metering module to the terminals of the electrical switching apparatus, and a support member adjacent the electrical switching apparatus, the mounting member comprising:
    a base portion structured to retain the metering module;
    a number of coupling portions structured to couple the mounting member to the support member; and
    a number of directing portions, each of the directing portions being structured to receive a corresponding one of the electrical conductors.

2. The mounting member of claim 1 wherein the number of directing portions is three directing portions; and wherein the mounting member further comprises a pair of dividing walls, each of the dividing walls being disposed between a corresponding pair of the directing portions.

3. The mounting member of claim 2 wherein the base portion comprises a mounting surface structured to engage the metering module, the mounting surface being disposed in a plane; and wherein each of the dividing walls is an elongated member extending in a first direction normal to the plane.

4. The mounting member of claim 3 wherein each of the coupling portions is structured to couple the mounting member to the support member at a corresponding junction; and wherein each corresponding junction is spaced from the mounting surface in the first direction and spaced from the mounting surface in a second direction normal to the first direction.

5. The mounting member of claim 1 wherein the base portion comprises a number of protrusions structured to extend into the metering module.

6. The mounting member of claim 5 wherein the number of protrusions is three protrusions, each of the three protrusions having a planar portion; and wherein the planar portion of each of the three protrusions is coplanar with others of the three protrusions.

7. The mounting member of claim 6 wherein the base portion further comprises a first retaining wall and a second retaining wall disposed opposite from and parallel to the first retaining wall; wherein the first retaining wall and the second retaining wall are structured to retain the metering module therebetween; and wherein each planar portion is disposed between and normal to the first retaining wall and the second retaining wall.

8. A switchgear assembly comprising:
    a mounting element;
    an electrical switching apparatus having a number of terminals and being coupled to the mounting element;
    a metering module having a number of terminals and being spaced from the electrical switching apparatus;
    a number of electrical conductors electrically connecting the terminals of the metering module to the terminals of the electrical switching apparatus;
    a support member adjacent the electrical switching apparatus; and
    a mounting member comprising:
        a base portion, the metering module being retained in the base portion;
        a number of coupling portions coupling the mounting member to the support member; and
        a number of directing portions, each of the directing portions receiving a corresponding one of the electrical conductors.

9. The switchgear assembly of claim 8 wherein the number of directing portions is three directing portions; and wherein the mounting member further comprises a pair of dividing walls, each of the dividing walls being disposed between a corresponding pair of the directing portions.

10. The switchgear assembly of claim 9 wherein the base portion comprises a mounting surface engaging the metering module, the mounting surface being disposed in a plane; and wherein each of the dividing walls is an elongated member extending in a first direction normal to the plane.

11. The switchgear assembly of claim 10 wherein each of the coupling portions couples the mounting member to the support member at a corresponding junction; and wherein each corresponding junction is spaced from the mounting surface in the first direction and spaced from the mounting surface in a second direction normal to the first direction.

12. The switchgear assembly of claim 8 wherein the base portion comprises a number of protrusions extending into the metering module.

13. The switchgear assembly of claim 12 wherein the number of protrusions is three protrusions, each of the three protrusions having a planar portion; and wherein the planar portion of each of the three protrusions is coplanar with others of the three protrusions.

14. The switchgear assembly of claim 13 wherein the base portion further comprises a first retaining wall and a second retaining wall disposed opposite from and parallel to the first retaining wall; wherein the first retaining wall and the second retaining wall retain the metering module therebetween; and wherein each planar portion is disposed between and normal to the first retaining wall and the second retaining wall.

15. The switchgear assembly of claim 8 wherein the number of electrical conductors is three electrical conductors; wherein each of the three electrical conductors has a first portion extending into a corresponding one of the terminals of the metering module, a second portion extending into a corresponding one of the terminals of the electrical switching apparatus and being parallel to the first portion, and a third portion disposed between and normal to the first and second portions.

16. A power distribution system comprising:
an electrical enclosure;
a switchgear assembly disposed on the electrical enclosure, the switchgear assembly comprising:
a mounting element;
an electrical switching apparatus having a number of terminals and being coupled to the mounting element;
a metering module having a number of terminals and being spaced from the electrical switching apparatus;
a number of electrical conductors electrically connecting the terminals of the metering module to the terminals of the electrical switching apparatus;
a support member adjacent the electrical switching apparatus; and
a mounting member comprising:
a base portion, the metering module being retained in the base portion;
a number of coupling portions coupling the mounting member to the support member; and
a number of directing portions, each of the directing portions receiving a corresponding one of the electrical conductors.

17. The power distribution system of claim 16 wherein the number of directing portions is three directing portions; wherein the mounting member further comprises a pair of dividing walls, each of the dividing walls being disposed between a corresponding pair of the directing portions; wherein the base portion comprises a mounting surface engaging the metering module, the mounting surface being disposed in a plane; and wherein each of the dividing walls is an elongated member extending in a first direction normal to the plane.

18. The power distribution system of claim 17 wherein each of the coupling portions couples the mounting member to the support member at a corresponding junction; and wherein each corresponding junction is spaced from the mounting surface in the first direction and spaced from the mounting surface in a second direction normal to the first direction.

19. The power distribution system of claim 16 wherein the base portion comprises:
three protrusions extending into the metering module, each of the three protrusions having a planar portion, the planar portion of each of the three protrusions being coplanar with others of the three protrusions;
a first retaining wall; and
a second retaining wall disposed opposite from and parallel to the first retaining wall;
wherein the first retaining wall and the second retaining wall retain the metering module therebetween; and
wherein each planar portion is disposed between and normal to the first retaining wall and the second retaining wall.

20. The power distribution system of claim 16 further comprising a cover disposed opposite the support member, the metering module and the electrical switching apparatus being disposed between the support member and the cover; wherein the electrical switching apparatus is a three-phase molded case circuit breaker; wherein the metering module is a power monitoring metering module; wherein the mounting element is a draw-out element; wherein the number of directing portions is three directing portions and the number of electrical conductors is three electrical conductors, each of the three electrical conductors having a first portion extending into a corresponding one of the terminals of the metering module, a second portion extending into a corresponding one of the terminals of the electrical switching apparatus and being parallel to the first portion, and a third portion disposed between and normal to the first and second portions; and wherein the electrical enclosure is selected from a group consisting of a panelboard and a switchboard.

* * * * *